United States Patent [19]

Tombarelli

[11] Patent Number: 5,419,077
[45] Date of Patent: May 30, 1995

[54] LIQUID FOR NEUTRALIZING BUGS AND A METHOD AND LIQUID DISBURSING DEVICE TO COVER BUGS

[76] Inventor: David Tombarelli, Marbles La., Bradford, Mass. 01835

[21] Appl. No.: 148,980

[22] Filed: Nov. 8, 1993

[51] Int. Cl.$^6$ .............................................. A01K 7/00
[52] U.S. Cl. .................................. 43/132.1; 239/121; 239/288.5
[58] Field of Search ........................ 43/132.1, 124, 900; 239/104, 121, 288.5, 588, 154; 222/383

[56] References Cited

U.S. PATENT DOCUMENTS

| | | | |
|---|---|---|---|
| 2,136,050 | 11/1938 | Holden | 239/288.5 |
| 2,548,196 | 4/1951 | Clark | 239/288.5 |
| 2,589,020 | 3/1952 | North, Jr. | 239/104 |
| 2,789,396 | 4/1957 | Jernander et al. | 239/154 |
| 2,928,610 | 3/1960 | Fenimore | 239/288.5 |
| 3,672,380 | 6/1972 | Schuster | 239/288.5 |
| 3,797,749 | 3/1974 | Tada | 222/383 |
| 4,705,191 | 11/1987 | Itzel et al. | 222/383 |
| 5,251,820 | 10/1993 | Ho | 239/588 |
| 5,263,646 | 11/1993 | McCauley | 239/154 |

OTHER PUBLICATIONS

"Hechinger" p. 38, Jun. 1994.

Primary Examiner—P. Austin Bradley
Assistant Examiner—Chuck Y. Mah
Attorney, Agent, or Firm—Edward A. Gordon; William J. Daley

[57] ABSTRACT

The present invention comprises a liquid for neutralizing bugs, a liquid disbursing device to cover the bugs and insert them with the liquid and a method for neutralizing and removing bugs. The liquid for neutralizing bugs is not toxic to humans and comprises a combined solution of n-alkyl dimethyl ethylbenzyl ammonium chlorides; n-alkyl dimethyl ethylbenzyl ammonium chlorides; extract of amaranthus retroflexus; vinegar and inert ingredients. Water may also be included. The liquid disbursing device comprises a liquid container with an upper hand fingers liquid pumping cylinder. Attached to the liquid pumping cylinder is a new and improved large funnel cap type device to catch the bug and spray the liquid about the entire outer area of the cap device to contact the by or bugs in any position. In an alternate embodiment the cap type device is provided with a forward lower configuration to receive the neutralized bug as it falls from its position. In another alternate embodiment the funnel cap type device is attached to a solid tube device to be held by the user's hand and an extendable flexible tube with the upper end attached to the bottom of the solid tube and the lower end attached to the pumping cylinder.

5 Claims, 3 Drawing Sheets

LIQUID FOR NEUTRALIZING BUGS AND A METHOD AND LIQUID DISBURSING DEVICE TO COVER BUGS

BACKGROUND OF THE INVENTION

1. Field of the Invention

The present invention relates generally to bug exterminator means and more particularly to a new and improved liquid for neutralizing bugs and a method and liquid disbursing device to cover bugs.

2. Description of Prior Art

There are numerous prior art organic compounds which are used to kill insects.

U.S. Pat. No. 5,110,804 discloses a non-toxic insecticide composition for killing white flies, scale insects and mealy bugs comprising a viscous aqueous solution of modified cold water swelling corn starch consisting essentially of amylopectin prepared from intact fully-swollen corn granules as determined by microscopic analysis. The solution is used to entrap and/or asphyxiate the insects.

The following U.S. patents are also believed to exemplify the present state of the art with respect to organic compounds: U.S. Pat. Nos. 4,361,554; 5,100,920; and 5,110,594.

There are numerous prior art cap spraying devices which are used for various purposes including killing insects.

U.S. Pat. No. 4,413,756 discloses a device for instantaneous, non-poisonous extermination of insects by means of an aerosol assembly having a cap enclosure removably secured to the aerosol nozzle for trapping an insect. The propellent in the aerosol can, upon release in the cap enclosure, expands suddenly to form an extremely cold gas that instantaneously freezes any insect trapped in said cap enclosure. The valve assembly and cap enclosure can be selectively turned to permit the extinction of insects on floors, walls and ceilings. A child safety device is utilized which permits actuation of the valve only when the assembly is in a certain position. A further safety device is provided to prevent the discharge of the contents thereof only when the cap is pressed against a firm surface.

The following U.S. patents are also believed to exemplify the present state of the art with respect to cap spraying devices: U.S. Pat. Nos. 2,928,610; 630,613; and 619,257.

While such prior art devices and liquids provide improvement in the areas intended, there still exists a need for a new and improved liquid and liquid disbursing device for neutralizing bugs and the method for contacting the bugs which overcomes some of the disadvantages of the prior art.

Accordingly a principle desirable object of the present invention is to provide new and improved liquid for neutralizing bugs.

Another desirable object of the present invention is to provide a new and improved method and liquid disbursing device to contact and cover and remove bugs located at such areas as walls, windows, floors and ceilings and other types of surfaces such as irregular and soft surfaces.

Another desirable object of the present invention is to provide a liquid which neutralizes the bug but does not freeze or kill the bug.

These and other desirable objects of the invention will in part appear hereinafter and will in part become apparent after consideration of the specification with reference to the accompanying drawings and the claims.

SUMMARY OF THE INVENTION

The present invention comprises a liquid for neutralizing bugs, a liquid disbursing device to cover the bugs and insert them with the liquid and a method for neutralizing and removing bugs. It should be understood that in this invention the term bug includes, for example, insects such as ants, flies, grasshoppers, mosquitos, bees, crickets, etc.. The liquid for neutralizing bugs and which is not toxic to humans comprises a combined solution of n-alkyl dimethyl ethylbenzyl ammonium chlorides; n-alkyl dimethyl ethylbenzyl ammonium chlorides; extract of amaranthus retroflexus; vinegar and inert ingredients. Water may also be included. The liquid disbursing device comprises a liquid container with an upper hand fingers liquid pumping cylinder. Attached to the liquid pumping cylinder is a new and improved large funnel cap type device to catch the bug and spray the liquid about the entire outer area of the cap device to contact the bug in any position. In an alternate embodiment the cap type device is provided with a forward lower configuration to receive the neutralized bug as it falls from its position. In another alternate embodiment the funnel cap type device is attached to a solid tube device to be held by the user's hand and an extendable flexible tube with the upper end attached to the bottom of the solid tube and the lower end attached to the pumping cylinder. In this embodiment the funnel cap type device can be moved quickly with one hand to different selected areas where bugs are located while the liquid pumping container is held by the other hand or by another person.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DETAILED DESCRIPTION OF PREFERRED EMBODIMENT(S)

Figure 1:
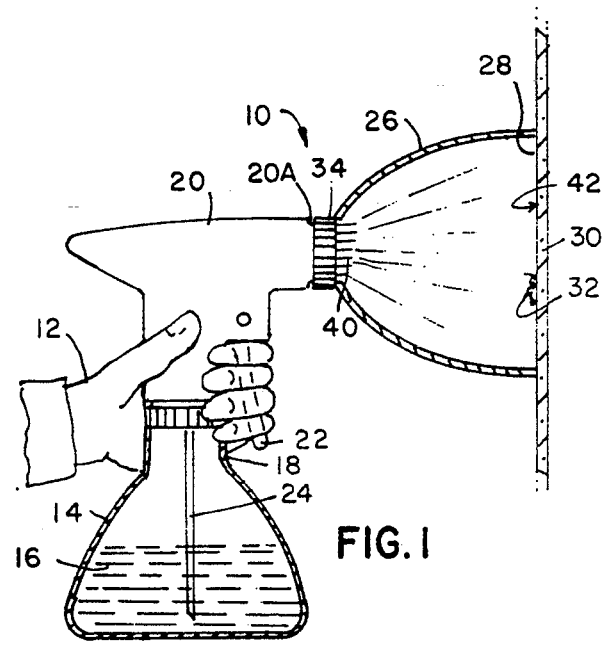
FIG. 1 is a fragmentary perspective view showing the liquid disbursing device and the method in which the liquid disbursing device operates.
Figure 2:
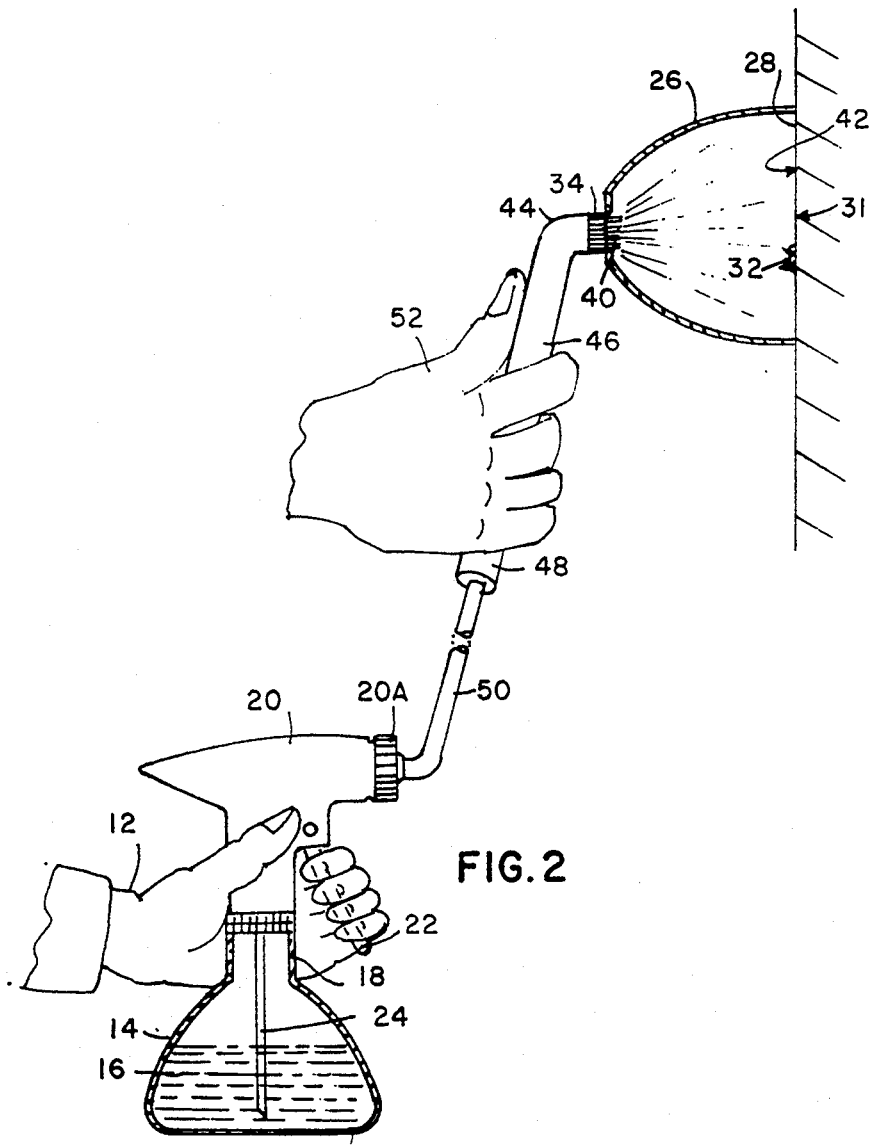
FIG. 2 is a fragmentary perspective view showing an alternate embodiment of the liquid disbursing device and the method in which the liquid disbursing device operates.
Figure 3:
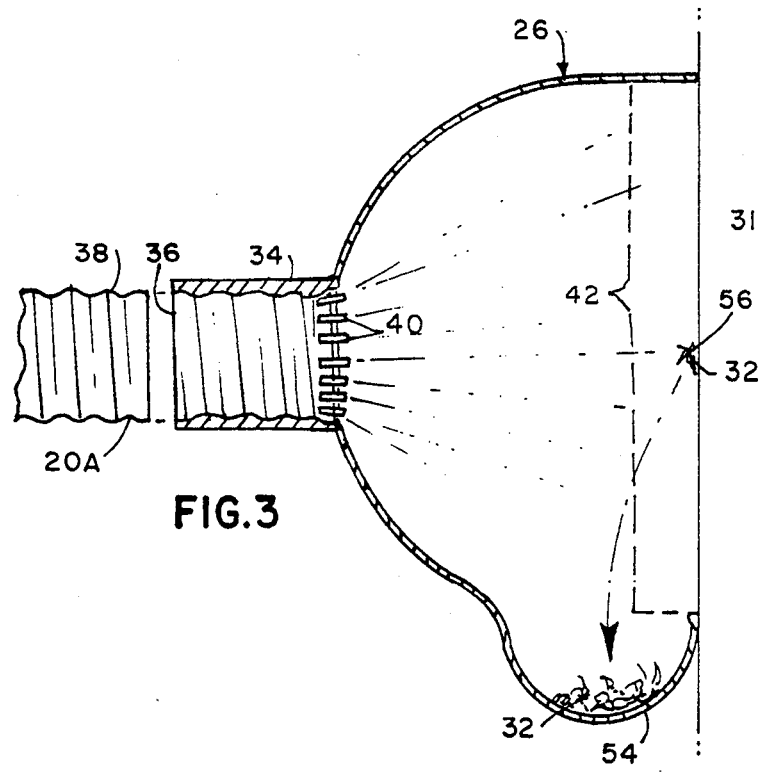
FIG. 3 is a cross-sectional view of an alternate embodiment of the funnel cap device.
Figure 4:
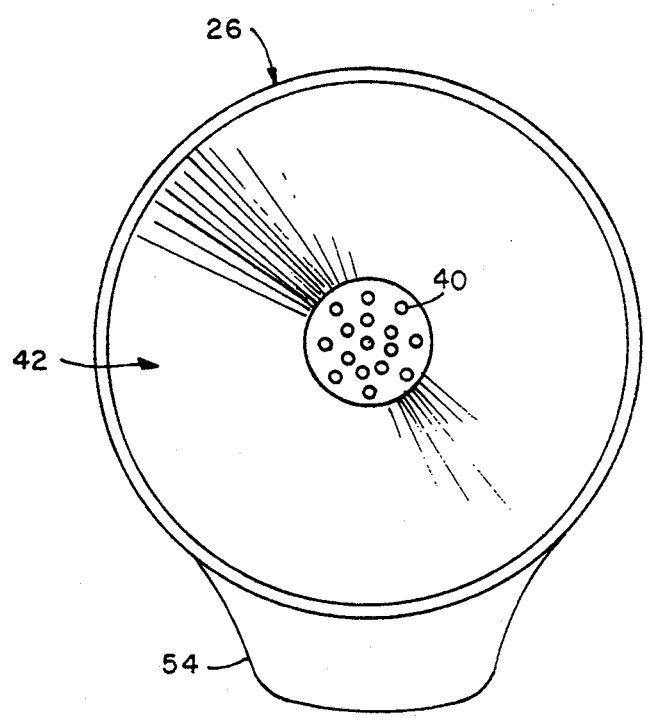
FIG. 4 is a front elevational view of the funnel cap device of FIG. 3.

Referring now to the drawings and more particularly to FIG. 1, there is illustrated generally by the numeral 10 the liquid disbursing device for neutralizing bugs. The liquid disbursing device 10 which is shown as being held by a user's hand 12 includes a liquid container section 14 within which the liquid 16 to be sprayed out is inserted. Releasably attached to the top section 18 of the liquid container 14 is a liquid pumping cylinder 20 with a hand pumping device 22. During hand pumping the liquid 16 is drawn up through the tube 24, the pumping cylinder 20 and through the new and improved funnel cap device 26. The funnel cap 26 has a large open front area 28 to be able to enclose an area on a device such as a window 30 to enclose a bug 32 on the window. As best shown in FIG. 3, the back attaching portion 34 of the funnel cap 26 is provided with inner male threads 36 for attachment to the female threads 38 formed on the cap attaching end 20A of the pumping cylinder 20. As best shown in FIGS. 3 and 4, the funnel cap 26 includes a plurality of tubes 40 which extend around the inner side of the funnel cap 26 to permit the liquid 16 to be sprayed completely about the forward opening 42 of the funnel cap 26. In this manner the bugs are not missed by the liquid. Returning to FIG. 2, there is illustrated an alternate embodiment of the funnel cap 26. In this embodiment the funnel cap 26 is attached to the top end 44 of the solid tube device 46. The bottom end 48 of the tube device 46 is attached to an extendable flexible tube 50 which is attached to the cap attaching end 20A of the pumping cylinder 20. In this embodiment the second hand 52 of the user can be used to move the funnel cap 26 to various areas such as the wall 31 without having to move the pumping cylinder 20 the same distance which is held by another hand 12.

Referring now to FIGS. 3 and 4, there is illustrated an alternate embodiment of the funnel cap device 26. In this embodiment the bottom portion of the funnel cap 26 is provided with a forward lower configuration section area 54 to receive neutralized bugs 32 when they fall from their initial position such as 56.

Figure 5:
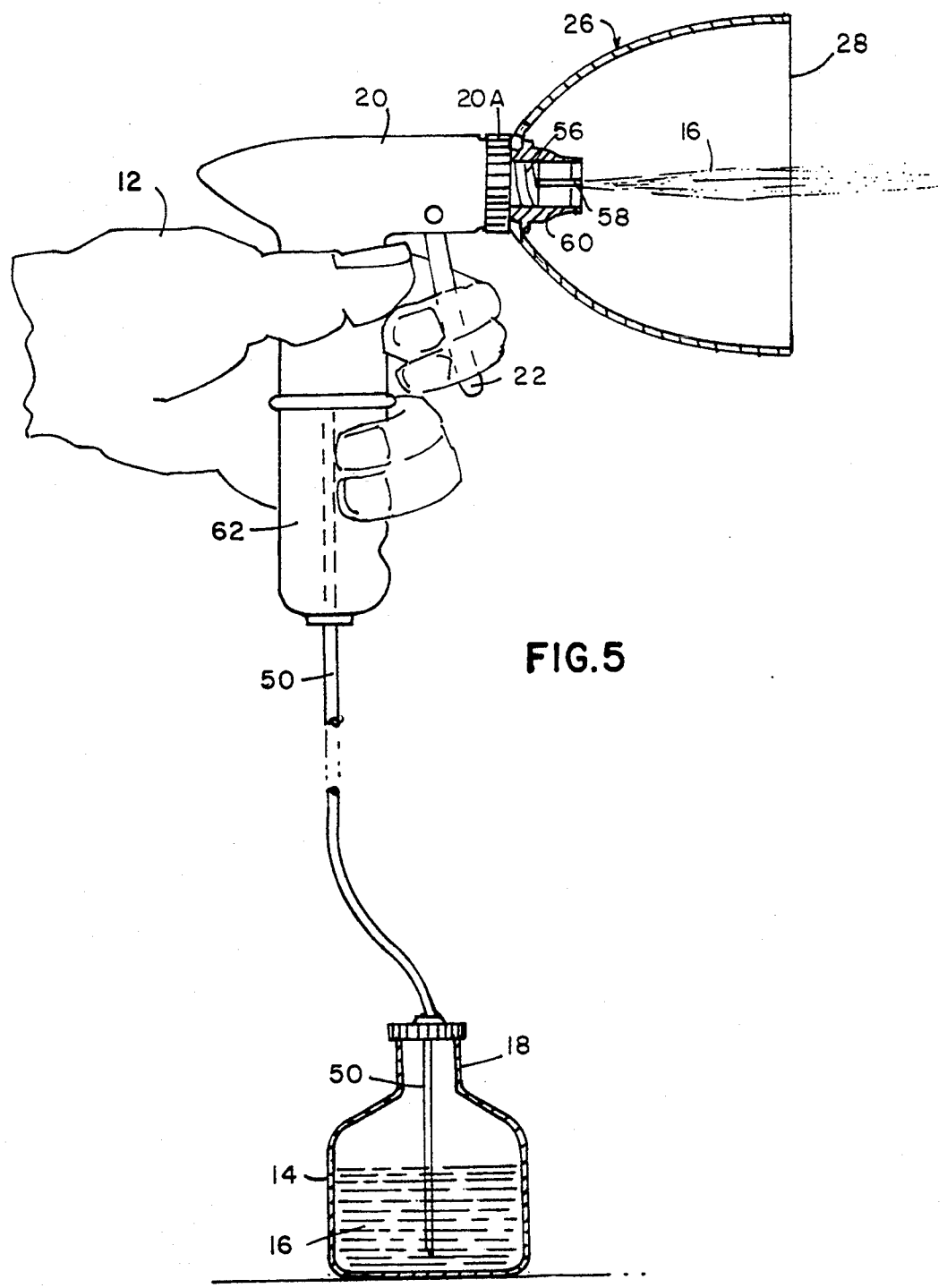
FIG. 5 is a fragmentary perspective view of an alternate embodiment of the liquid disbursing device and the method in which the liquid disbursing device operates.

Referring now to FIG. 5 there is illustrated an alternate embodiment of the liquid disbursing device. In this embodiment the cap attaching end 20A is provided with a central orifice device 56 which has a forward small liquid disbursing tube device 58 through which the liquid 16 is drawn up through the long flexible tube 50 from the liquid container 14 and exits through and out of the tube device 58 in a generally straight direction within and out of the funnel cap device 26. As shown, the funnel cap device 26 is shown affixed to the cap attaching end 20A by means of the central orifice device 56 and the mating threaded connector 60. In this embodiment the pumping cylinder 20 includes a bottom cap device 62 fitting over a portion of the flexible tube 50 so that the pumping cylinder 20 can be held by the users hand 20 without contacting the tube 50. In this embodiment the liquid disbursing device can be operated with one hand to move the funnel cap 26 to various areas and to spray the liquid 16 out with the same hand in a generally straight direction based on the liquid tube 56. In this manner the liquid will contact the main area where a bug or bugs are located for neutralization.

The new and improved liquid for neutralizing bugs and which is not toxic to humans comprises a solution of n-alkyl dimethyl ethylbenzyl ammonium chlorides; n-alkyl dimethyl ethylbenzyl ammonium chlorides; extract of amaranthus retroflexus; vinegar and inert ingredients. Water may also be included. The following is several examples of the compositions of the liquid ingredients.

| Water | 60.00 | 50.00 | 0 | 0 |
| N-Alkyl Dimethyl Benzyl Ammonium Chlorides | 1.60 | 1.60 | 1.60 | 1.60 |
| N-Alkyl Dimethyl Ethylbenzyl Ammonium Chlorides | 1.60 | 1.60 | 1.60 | 1.60 |
| Extract of Amaranthus Retroflexus | .30 | .50 | .30 | .50 |
| Vinegar | .30 | .10 | .30 | .10 |
| Inert Ingredients | 36.20 | 46.20 | 96.20 | 96.20 |

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A liquid composition for neutralizing bugs comprising:
   a n-alkyl dimethyl benzyl ammonium chlorides;
   a n-alkyl dimethyl ethylbenzyl ammonium chlorides;
   an extract of amaranthus retroflexus;
   a composition of vinegar; and
   a composition of inert ingredients.

2. The composition according to claim 1 wherein the liquid includes a portion of water.

3. A bug neutralizing device comprising:
   a liquid container section;
   a bug neutralizing liquid positioned within said liquid container;
   a liquid pumping cylinder attached to the liquid container section;
   a funnel cap means attached to the liquid pumping cylinder;
   said funnel cap means having a large open front area to enclose a bug positioned on a device;
   said funnel cap means having a forward lower means to receive neutralized bugs when they fall from their initial position;
   an elongated flexible tube means attached to the liquid container and the liquid pumping cylinder attached to the funnel cap device whereby the funnel cap device can be moved to various areas without having to move the liquid container;
   a liquid contained within the liquid container section; and means for spraying the liquid on the bug whereby the liquid neutralizes the bug.

4. A bug neutralizing device comprising:
   a liquid container section;
   a bug neutralizing liquid positioned within said liquid container;
   said neutralizing liquid comprising a n-alkyl dimethyl benzyl ammonium chlorides, a n-alkyl dimethyl ethylbenzyl ammonium chlorides, an extract of amaranthus retroflexus, a composition of vinegar, and a composition of inert ingredients;
   a liquid pumping cylinder;
   a funnel cap device attached to the liquid pumping cylinder, said funnel cap device having a large open front area to enclose a bug positioned on a device;
   an elongated flexible tube means attached to the liquid container and the liquid pumping cylinder attached to the funnel cap device whereby the funnel cap device can be moved to various areas without having to move the liquid container; and
   means for spraying the liquid on the bug whereby the liquid neutralizes the bug.

5. The bug neutralizing device according to claim 4 further comprising a funnel cap means having a forward lower means to receive neutralized bugs when they fall from their initial position.

* * * * *